United States Patent
Watanabe et al.

(10) Patent No.: US 12,555,477 B2
(45) Date of Patent: Feb. 17, 2026

(54) NOTIFICATION APPARATUS, NOTIFICATION METHOD, NOTIFICATION PROGRAM, AND RECORDING MEDIUM

(71) Applicant: PIONEER CORPORATION, Tokyo (JP)

(72) Inventors: Kazuhiro Watanabe, Saitama (JP); Masao Nakane, Saitama (JP)

(73) Assignee: PIONEER CORPORATION, Tokyo (JP)

( * ) Notice: Subject to any disclaimer, the term of this patent is extended or adjusted under 35 U.S.C. 154(b) by 259 days.

(21) Appl. No.: 18/249,687

(22) PCT Filed: Oct. 20, 2020

(86) PCT No.: PCT/JP2020/039311
§ 371 (c)(1),
(2) Date: Apr. 19, 2023

(87) PCT Pub. No.: WO2022/085059
PCT Pub. Date: Apr. 28, 2022

(65) Prior Publication Data
US 2023/0386333 A1   Nov. 30, 2023

(51) Int. Cl.
*G06V 20/58* (2022.01)
*G08G 1/0968* (2006.01)

(52) U.S. Cl.
CPC .......... *G08G 1/0968* (2013.01); *G06V 20/58* (2022.01)

(58) Field of Classification Search
CPC .......... G06T 7/00; G06V 10/25; G06V 20/58; G08G 1/09
See application file for complete search history.

(56) References Cited

U.S. PATENT DOCUMENTS

2020/0292350 A1*  9/2020  Oe ..................... G01C 21/3647
2021/0179138 A1*  6/2021  Terazawa ........... G01C 21/3476
(Continued)

FOREIGN PATENT DOCUMENTS

JP   2005-249485 A   9/2005
JP   2007-323556 A   12/2007
(Continued)

OTHER PUBLICATIONS

Office Action received in corresponding JP Application No. 2022-556843, dated Jan. 9, 2024, in 14 pages, with translation.
(Continued)

*Primary Examiner* — Charles J Han
(74) *Attorney, Agent, or Firm* — Procopio, Cory, Hargreaves & Savitch LLP

(57) ABSTRACT

A notification apparatus includes an image obtaining unit and a notifying unit. The image obtaining unit obtains a surrounding image as an image of a surrounding of a moving body photographed from the moving body. The notifying unit notifies information regarding a type of an object when an object different from a predetermined feature appears in a first area where the predetermined feature is expected to appear inside the surrounding image. The first area is determined based on map information including position information of the predetermined feature and a position of the moving body at a time when the surrounding image is photographed.

9 Claims, 20 Drawing Sheets

(56) References Cited

U.S. PATENT DOCUMENTS

2021/0180979 A1   6/2021   Kitahara
2021/0199463 A1   7/2021   Kitahara et al.

FOREIGN PATENT DOCUMENTS

| JP | 2011-107025 A | 6/2011 |
|---|---|---|
| JP | 2019-041334 A | 3/2019 |
| JP | 2020-38200 A | 3/2020 |
| JP | 2020-38359 A | 3/2020 |
| JP | 2020-38361 A | 3/2020 |
| JP | 2020-149575 A | 9/2020 |
| WO | 2007/088915 A1 | 8/2007 |

OTHER PUBLICATIONS

Office Action received in corresponding JP Application No. 2022-556843, dated Jul. 30, 2024, in 18 pages, with translation.
International Search Report (with translation) and Written Opinion received in corresponding International Application No. PCT/JP2020/039311, mailed Jan. 19, 2021, in 9 pages.
Office Action received in corresponding JP Application No. 2022-556843, dated Apr. 23, 2024, in 12 pages, with translation.
Japanese Patent Office, Notice of Rejection, Application No. 2024-190301, dated Aug. 26, 2025, in 9 pages.

\* cited by examiner

| TB1 | |
|---|---|
| LINK ID | VISUALLY RECOGNIZABLE FEATURE |
| R L 1 | FT1 |
| R L 2 | FT2 |
| R L 3 | FT3, FT4 |
| R L 4 | - |
| . | . |
| . | . |
| . | . |

| VISUALLY RECOGNIZABLE FEATURE | POSITION INFORMATION |
|---|---|
| FT1 | X1, Y1 |
| FT2 | X2, Y2 |
| FT3 | X3, Y3 |
| FT4 | X4, Y4 |
| ⋮ | ⋮ |

| LANDMARK FEATURE | POSITION INFORMATION |
|---|---|
| LM1 | XX1, YY1 |
| LM2 | XX2, YY2 |
| LM3 | XX3, YY3 |
| LM4 | XX4, YY4 |
| ⋮ | ⋮ |

FIG.15

NOTIFICATION APPARATUS, NOTIFICATION METHOD, NOTIFICATION PROGRAM, AND RECORDING MEDIUM

CROSS-REFERENCE TO RELATED APPLICATIONS

This application is a US national stage application of International Application PCT/JP2020/039311, filed Oct. 20, 2020, the contents of which are incorporated by reference.

TECHNICAL FIELD

The present invention relates to a notification apparatus, a notification method, a notification program, and a recording medium.

BACKGROUND ART

Conventionally, there has been known a navigation device that performs route guidance while displaying a searched route. For example, Patent Document 1 discloses a navigation device that displays a road at a point or a section where a landscape object can be visually recognized in a display form different from those of other roads.

Patent document 1: Japanese Unexamined Patent Application Publication No. 2011-107025

DISCLOSURE OF THE INVENTION

Problems to be Solved by the Invention

For example, in a route guidance by a navigation device as described above, when actually driving on a road at a point or a section where a landscape object can be visually recognized, for example, a problem that a user cannot visually recognize the landscape object because of obstruction by another vehicle or a newly constructed building and is likely to be bewildered is included as one of problems.

The present invention has been made in view of the above-described point, and one of objects of the present invention is to provide a notification apparatus that, for example, in a case where guidance is performed by using a feature visually recognizable from a road, can reduce bewilderment of a user when the feature cannot be visually recognized from the road.

Solutions to the Problems

An exemplary aspect of the present invention is directed to a notification apparatus that includes an image obtaining unit and a notifying unit. The image obtaining unit obtains a surrounding image as an image of a surrounding of a moving body photographed from the moving body. The notifying unit notifies information regarding a type of an object when an object different from a predetermined feature appears in a first area where the predetermined feature is expected to appear inside the surrounding image. The first area is determined based on map information including position information of the predetermined feature and a position of the moving body at a time when the surrounding image is photographed.

Another exemplary aspect of the present invention is directed to a notification method performed by a notification apparatus. The notification method includes: an image obtaining step of obtaining a surrounding image as an image of a surrounding of a moving body photographed from the moving body; and a notifying step of notifying information regarding a type of an object when an object different from a predetermined feature appears in a first area where the predetermined feature is expected to appear inside the surrounding image, the first area being determined based on map information including position information of the predetermined feature and a position of the moving body at a time when the surrounding image is photographed.

Another exemplary aspect of the present invention is directed to a notification program executed by a notification apparatus comprising a computer. The notification program causes the computer to execute: an image obtaining step of obtaining a surrounding image as an image of a surrounding of a moving body photographed from the moving body; and a notifying step of notifying information regarding a type of an object when an object different from a predetermined feature appears in a first area where the predetermined feature is expected to appear inside the surrounding image, the first area being determined based on map information including position information of the predetermined feature and a position of the moving body at a time when the surrounding image is photographed.

BRIEF DESCRIPTION OF DRAWINGS

FIG. 4 is a diagram illustrating one example of data included in map information according to Embodiment 1.

FIG. 5 is a diagram illustrating one example of data included in the map information according to Embodiment 1.

FIG. 15 is a diagram illustrating one example of data included in the map information used for the route guidance of Embodiment 2.

DESCRIPTION OF PREFERRED EMBODIMENTS

Embodiments of the present invention are described in detail below. In the following description and accompanying drawings, the same reference signs are given to substantially the same or equivalent parts.

Embodiment 1

With reference to FIG. 1 to FIG. 5, a configuration of a feature guidance device 10 as a notification apparatus according to Embodiment 1 will be described.

Figure 1:
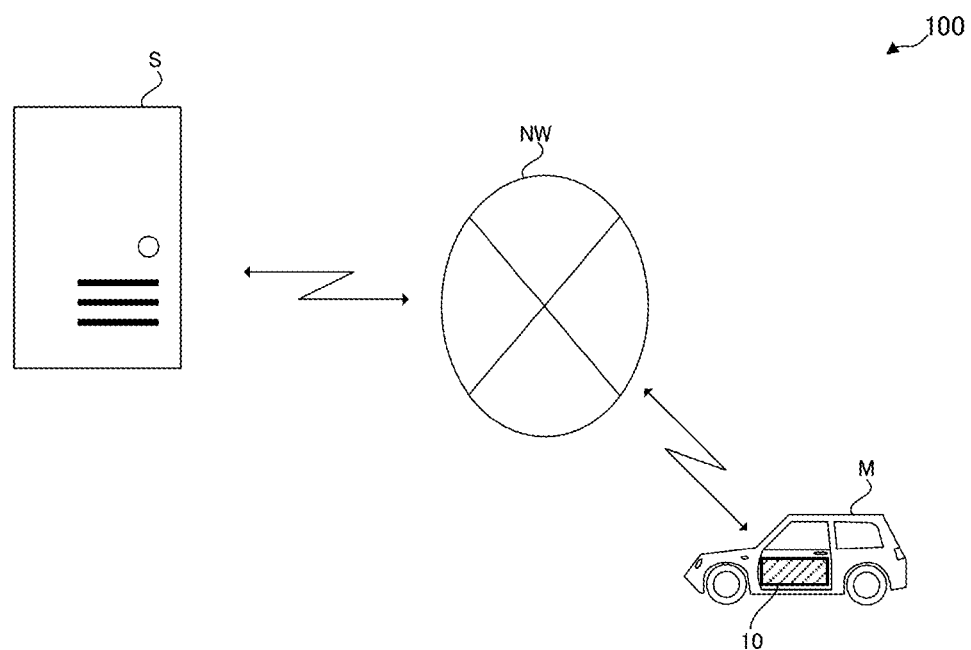
FIG. 1 is a diagram illustrating an outline of a notification system including a notification apparatus according to Embodiment 1.

FIG. 1 indicates an information exchange system 100 including the feature guidance device 10. As indicated in FIG. 1, the information exchange system 100 is configured to include the feature guidance device 10 mounted onto a vehicle M and a server S. The feature guidance device 10 performs transmission and reception of data with the server S via a network NW.

When the vehicle M travels on a road, the feature guidance device 10 performs feature guidance by presenting information on features around the road to a user boarding the vehicle M.

For example, the server S holds map information including information on the features. For example, the feature guidance device 10 transmits the information on the features around the road obtained when the vehicle M is travelling to the server S. The server S is configured to be able to update the information on the features in the map information corresponding to the information transmitted from the feature guidance device 10.

In this specification, a "feature" refers to all the natural or artificial objects such as trees, rivers, houses, roads, and railroads. Typically, the features are famous landmarks and the like, and include natural objects such as mountains and rocks, and structures such as temples and shrines and tall buildings.

Figure 2:
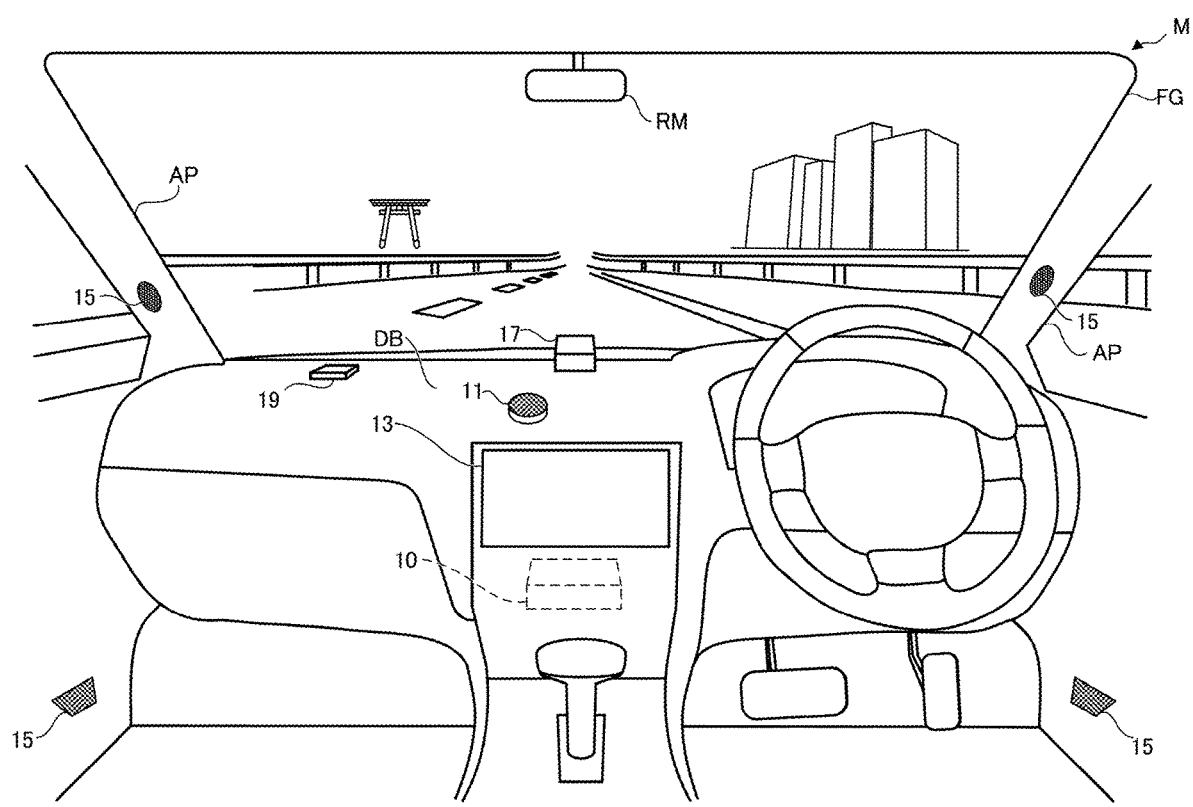
FIG. 2 is a diagram illustrating a front seat part of a vehicle on which the notification apparatus according to Embodiment 1 is mounted.

FIG. 2 is a diagram illustrating the front seat part of the vehicle M onto which the feature guidance device 10 according to Embodiment 1 is mounted. The feature guidance device 10 is disposed inside the center console inside the dashboard DB of the front seat of the vehicle M.

The feature guidance device 10 is communicatively connected to a microphone 11, a touch panel display 13, a speaker 15, and a camera 17 disposed inside the vehicle M. The feature guidance device 10 is connected to a GPS receiver 19. The microphone 11 and the touch panel display 13 are disposed, for example, on the dashboard DB. The speaker 15 is disposed, for example, in an A pillar AP or in the door-side of the door.

The microphone 11 is an acoustic device converting a voice to an electrical signal. The microphone 11 is disposed at a position between the driver's seat and the front passenger seat on the dashboard DB and transmits the voice of the user boarding on the front seat of the vehicle M to the feature guidance device 10.

The touch panel display 13 is configured to be combined with a display performing screen display based on control of the feature guidance device 10 and a touch panel that transmits a signal representing input operation from the user to the feature guidance device 10.

The speaker 15 is a device outputting the voice based on a signal transmitted from the feature guidance device 10.

The feature guidance device 10 accepts an operation input from the user via the microphone 11 or the touch panel display 13. The feature guidance device 10 displays information on a current position of the vehicle M and the features on the touch panel display 13. The feature guidance device 10 presents the information on the features by the voice from the speaker 15.

The camera 17 is disposed, for example, on the dashboard DB. The camera 17 is oriented so as to be able to photograph a surrounding image as an image of surroundings of the vehicle M. The camera 17 has a photographing direction set to the front of the vehicle M, that is, a travelling direction of the vehicle M. Assuming that the travelling direction of the vehicle M is set to be the front, the camera 17 is disposed so as to be able to photograph the surrounding image in a range including the front, the right front, and the left front. Accordingly, the camera 17 can photograph images inside the range of the field of view of the user taking the front seat of the vehicle M and looking the front.

The camera 17 is not limited to a case of being disposed on the dashboard DB, and may be disposed anywhere as long as it is possible to photograph the surrounding image in front of the vehicle M. For example, the camera 17 may be disposed on the back surface of a rearview mirror RM, that is, on a surface opposed to a windshield FG. The camera 17 may be disposed on an outer surface (an exterior surface) of the vehicle M, for example, on a hood, a front bumper, or the like.

The GPS receiver 19 is disposed, for example, on the dashboard DB, receives a signal (a GPS signal) from a Global Positioning System (GPS) satellite, and transmits it to the feature guidance device 10.

Figure 3:
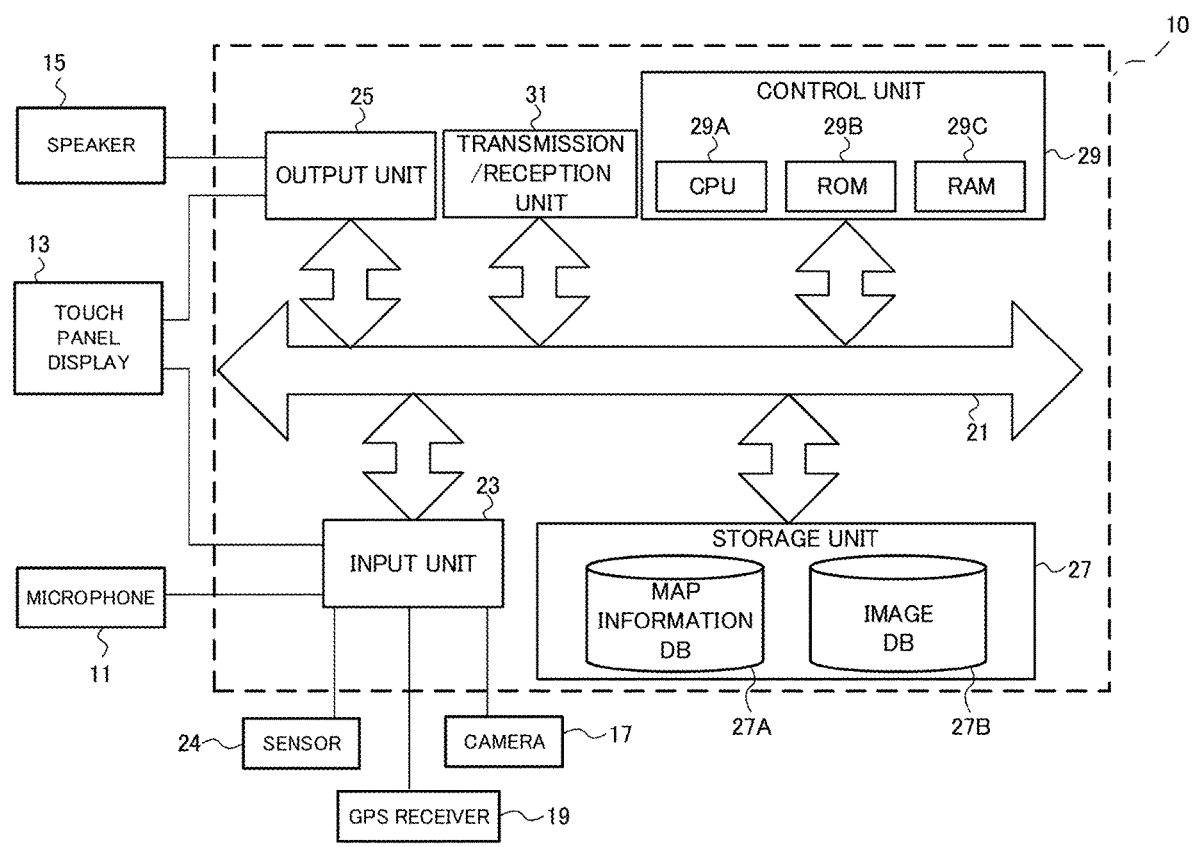
FIG. 3 is a block diagram illustrating a configuration of the notification apparatus according to Embodiment 1.

FIG. 3 is a block diagram illustrating a configuration of the feature guidance device 10. As indicated in FIG. 3, the feature guidance device 10 is configured by each unit being connected via a system bus 21.

An input unit 23 is an interface for obtaining data from devices included in the vehicle M. The input unit 23 is connected to the microphone 11 and a touch panel of the touch panel display 13, which are devices included in the vehicle M. The feature guidance device 10 accepts the input from the microphone 11 or the touch panel via the input unit 23.

As indicated in FIG. 3, the input unit 23 is connected to the camera 17. The feature guidance device 10 obtains the surrounding image of the vehicle M photographed by the camera 17 via the input unit 23.

The input unit 23 is connected to the GPS receiver 19 and a sensor 24. The sensor 24 is a group of sensors including, for example, an acceleration sensor, an angular velocity sensor, and a distance sensor. The feature guidance device 10 obtains data such as the position and the velocity of the vehicle M from the GPS receiver 19 and the sensor 24 via the input unit 23. For example, the data such as the position and the velocity of the vehicle M is used for obtainment of the current position for feature guidance by the feature guidance device 10.

An output unit 25 is connected to the display of the touch panel display 13 and the speaker 15, which are included in the vehicle M. The output unit 25 is an interface for supplying various kinds of pieces of information to the display and the speaker 15.

For example, the feature guidance device 10, via the output unit 25, supplies images of messages, maps, and the like, which are presented toward the user, to the display. For example, the feature guidance device 10, via the output unit 25, supplies the voice of guidance information for performing the guidance regarding the features toward the user to the speaker 15.

A storage unit 27 is a storage device constituted of, for example, a hard disk drive, a solid state drive (SSD), a flash memory, and the like. The storage unit 27 stores various kinds of programs executed in the feature guidance device 10. The various kinds of programs, for example, may be obtained from the server S, other server devices, or the like via the network, or may be recorded in a recording medium and read via various kinds of drive devices.

The storage unit 27 stores a map information database (hereinafter referred to as a map information DB) 27A. In the map information DB 27A, map information used for the feature guidance by the feature guidance device 10 is stored. In the map information, information on the features around a road used for the feature guidance is included. For example, in the map information, position information on the features and the images of the features photographed from the road are included.

Specifically, in the map information, in a road section (hereinafter also referred to as a road link) included in the map, the features that are visually recognizable from the road section are linked and saved.

FIG. 4 is a diagram indicating one example of linked data between the road sections and the features included in the map information stored in the map information DB 27A, as a table TB1. In the table TB1, each of RL1 to RL4 in a field of a "link ID" indicates each of a plurality of road links. In a field of a "visible/visually recognizable feature," the features FT1 to FT4 that are visually recognizable from vehicles traveling in each of the road sections are linked to each of the road sections.

For example, as indicated in FIG. 4, there is also the road link (RL3) to which a plurality of features are linked, and there is the road link (RL4) to which no feature is linked.

FIG. 5 is a diagram illustrating one example of the position information of the features included in the map information as a table TB2. As indicated in FIG. 5, the position information is linked to each of the visually recognizable features. The position information may be, for example, a global coordinate such as a latitude and a longitude and may be a local coordinate such as a relative coordinate with respect to a reference position.

In the map information stored in the map information DB 27A, the images in which each of features are photographed from road sections are linked to each of the features linked to each of the road sections and stored. In other words, in the map information, the images of the features linked to the road sections are included. The images are used, for example, to determine whether or not the feature visually recognizable from the road section during traveling is photographed in the surrounding image photographed from the vehicle M traveling on the road.

The storage unit 27 stores an image database (hereinafter referred to as an image DB) 27B that is a database in which the images of objects having possibility of being visually recognized from a moving body during moving are collected. For example, in the image DB 27B, the image data where objects such as various kinds of vehicles and buildings with various appearances, which can be an obstacle when the feature is visually recognized from the moving body, are photographed from various angles are stored.

For example, when the object being photographed in the surrounding image photographed from the vehicle M obstructs the visual recognition of the feature, the image data stored in the image DB 27B is used in identifying a type of the object. That is, in the image DB 27B, sample images of obstacles are stored.

A control unit 29 is a computer that includes a Central Processing Unit (CPU) 29A, a Read Only Memory (ROM) 29B, and a Random Access Memory (RAM) 29C and performs control of an operation of the feature guidance device 10. By reading and executing the various kinds of programs stored in the ROM 29B and the storage unit 27, the CPU 29A realizes various kinds of functions.

For example, the control unit 29 reads the programs of the feature guidance as a notification program of this embodiment from the storage unit 27 and executes them. The programs of the feature guidance proceed, for example, as follows.

First, the control unit 29 refers to the map information stored in the map information DB to search whether or not the feature visually recognizable from the road where the vehicle M is traveling is present.

When the visually recognizable feature is present, the control unit 29 obtains the surrounding image photographed by the camera 17 from the vehicle M.

The control unit 29 identifies a feature expectation area (a first area) where the visually recognizable feature is expected to appear inside the surrounding image and sets it as a determination area. The feature expectation area is determined based on the position of the visually recognizable feature and the position of the vehicle M at a time when the surrounding image is photographed. The control unit 29 determines whether or not the visually recognizable feature appears in the determination area by comparing the image of the visually recognizable feature stored in the map information DB 27A and the image inside the determination area.

When the visually recognizable feature appears in the determination area, the control unit 29 provides the user with information that becomes the guidance regarding the visually recognizable feature by a voice output from the speaker 15 or an image display on the touch panel display 13.

When an object different from the visually recognizable feature is photographed in the determination area, the control unit 29 identifies a type of the different object. For example, the control unit 29 identifies the type of the object appearing in the determination area by comparing the image in the determination area with the images of the various objects stored in the image DB 27B in the storage unit 27.

The control unit 29 presents the guidance information including information regarding the type of the identified object to the user. When the type of the object corresponds to a predetermined type, the information including the type of the object is transmitted to the server S.

Thus, in executing the feature guidance program, when the visually recognizable feature does not appear in the determination area in the surrounding image, that is, the user is in a state of being unable to recognize the visually recognizable feature, the control unit 29 notifies the user or an external server of the information including the type of the object obstructing the visual recognition of the visually recognizable feature.

The control unit 29 transmits the information regarding the feature obtained during traveling of the vehicle M to the server S. For example, when a building that is not present in the map information is newly constructed, and thus, the visual recognition of the feature that was originally present in the map information is obstructed, the control unit 29 transmits the information regarding the new building, for example, the position information of the new building to the server S.

A transmission/reception unit 31 is a network adapter such as a Network Interface Card (NIC) connected to a wireless communication apparatus (not illustrated). The transmission/reception unit 31 performs transmission and reception of data between the feature guidance device 10 and the outside in accordance with an instruction from the control unit 29.

With reference to FIG. 6 to FIG. 10, one example of the feature guidance executed by the feature guidance device 10 of this embodiment will be described.

Figure 6:
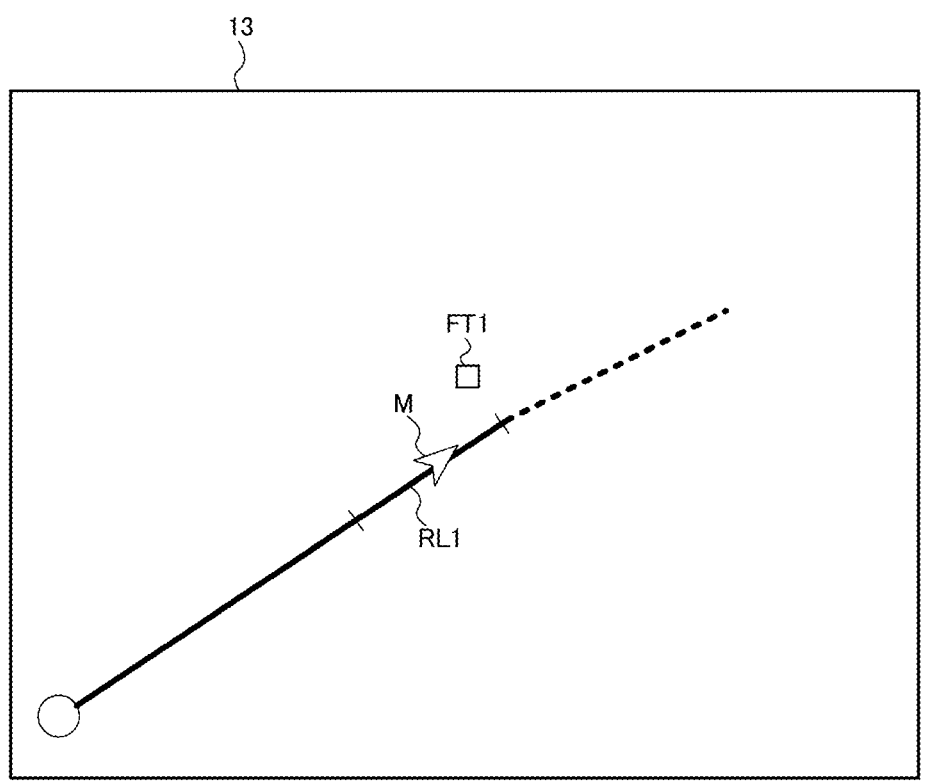
FIG. 6 is a view illustrating one example of a guidance view according to Embodiment 1.

FIG. 6 is a view illustrating one example of a feature guidance view displayed on the display. The feature guidance view is a view displayed, for example, by a current position of a vehicle (an own vehicle mark) or the like being superimposed on a map image based on the map information. In FIG. 6, a display indicating the current position of the vehicle M and the feature FT1 is superimposed to be expressed in the road section RL1 on the map image.

In the example indicated in FIG. 6, the vehicle M is traveling in the road section RL1 where the feature FT1 is visually recognizable. For example, based on the current position and the travelling direction of the vehicle M and the position information of the feature FT1 included in the map information, a visually recognizable orientation of the feature FT1 relative to the travelling direction of the vehicle M and a distance between the vehicle M and the feature FT1 can be calculated.

Figure 7:
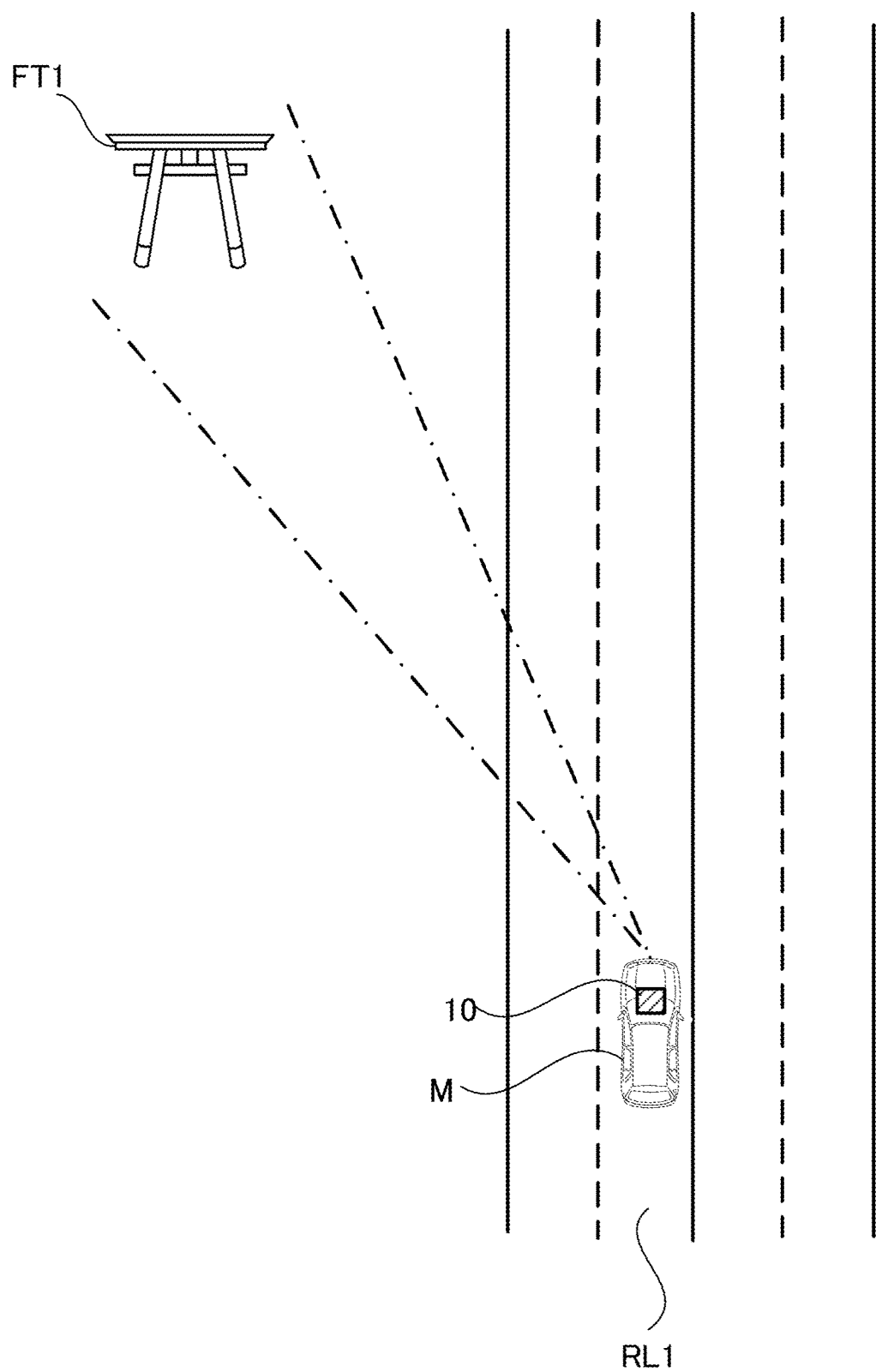
FIG. 7 is a view illustrating one example of a travelling situation of a moving body according to Embodiment 1.

FIG. 7 illustrates a travelling situation of the vehicle M travelling in the road section RL1. As indicated in FIG. 7, the feature FT1 is located in the left front direction of the vehicle M. In the situation indicated in FIG. 7, the user boarding the vehicle M can visually recognize the feature FT1 in the left front direction.

Figure 8:
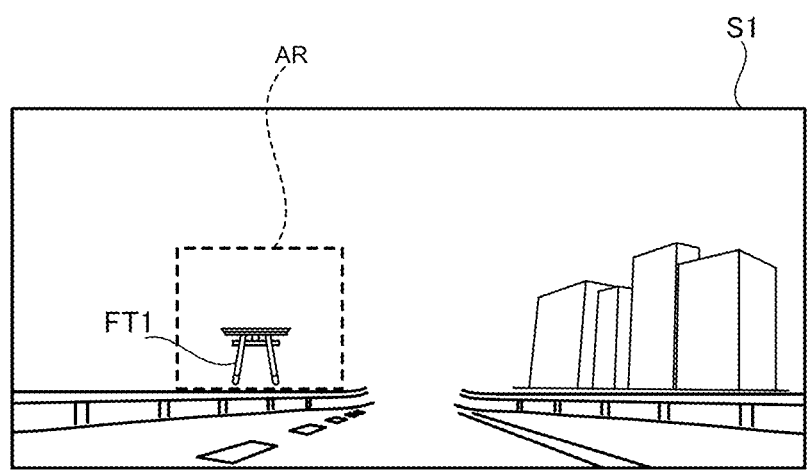
FIG. 8 is a view illustrating one example of a surrounding image used for guidance according to Embodiment 1.

FIG. 8 is a view illustrating a surrounding image S1 of the vehicle M obtained in the situation exemplified in FIG. 7. For example, the feature FT1 is linked to the road section RL1, and when the vehicle M is traveling in the road section RL1, the control unit 29 obtains the surrounding image S1 of the vehicle M from the camera 17 and identifies a determination area AR that is the feature expectation area where the feature FT1 is expected to be photographed inside the surrounding image S1.

For example, based on the orientation of the feature FT1 relative to the photographing direction at a time when the surrounding image S1 was photographed and the distance between the position of the vehicle M and the feature FT1 at the time when the photograph was taken, the control unit 29 identifies the determination area AR. For example, the orientation and the distance can be obtained by using the own vehicle position (the current position and the travelling direction of the vehicle M) and the position information of the feature FT1 included in the map information (for example, FIG. 5).

The control unit 29 determines whether or not the feature FT1 is photographed in the determination area AR. For example, by comparing the image of the feature FT1 preliminarily stored in the map information DB in the storage unit 27 with the determination area AR of the surrounding image S1, the control unit 29 determines whether or not the feature FT1 is photographed.

As described above, the camera 17 is disposed so as to be able to photograph the surrounding image in the range including the front, the right front, and the left front when the travelling direction of the vehicle M is set as the front and can photograph the surrounding image S1 inside the range of the field of view when the user boarding in the front seat of the vehicle M is looking forward. Accordingly, when the feature FT1 is photographed in the surrounding image including the determination area AR, it can be assumed that the user can visually recognize the feature FT1 from the vehicle M.

In the example indicated in FIG. 8, the control unit 29 determines that the feature FT1 is photographed in the determination area AR. In this case, the control unit 29 presents the guidance information that the feature FT1 is visually recognizable to the user via the speaker 15 or the display. For example, an announcement such as "You can see the large torii (shrine gate) on your left" is played from the speaker 15 or is displayed on the display.

Figure 9:
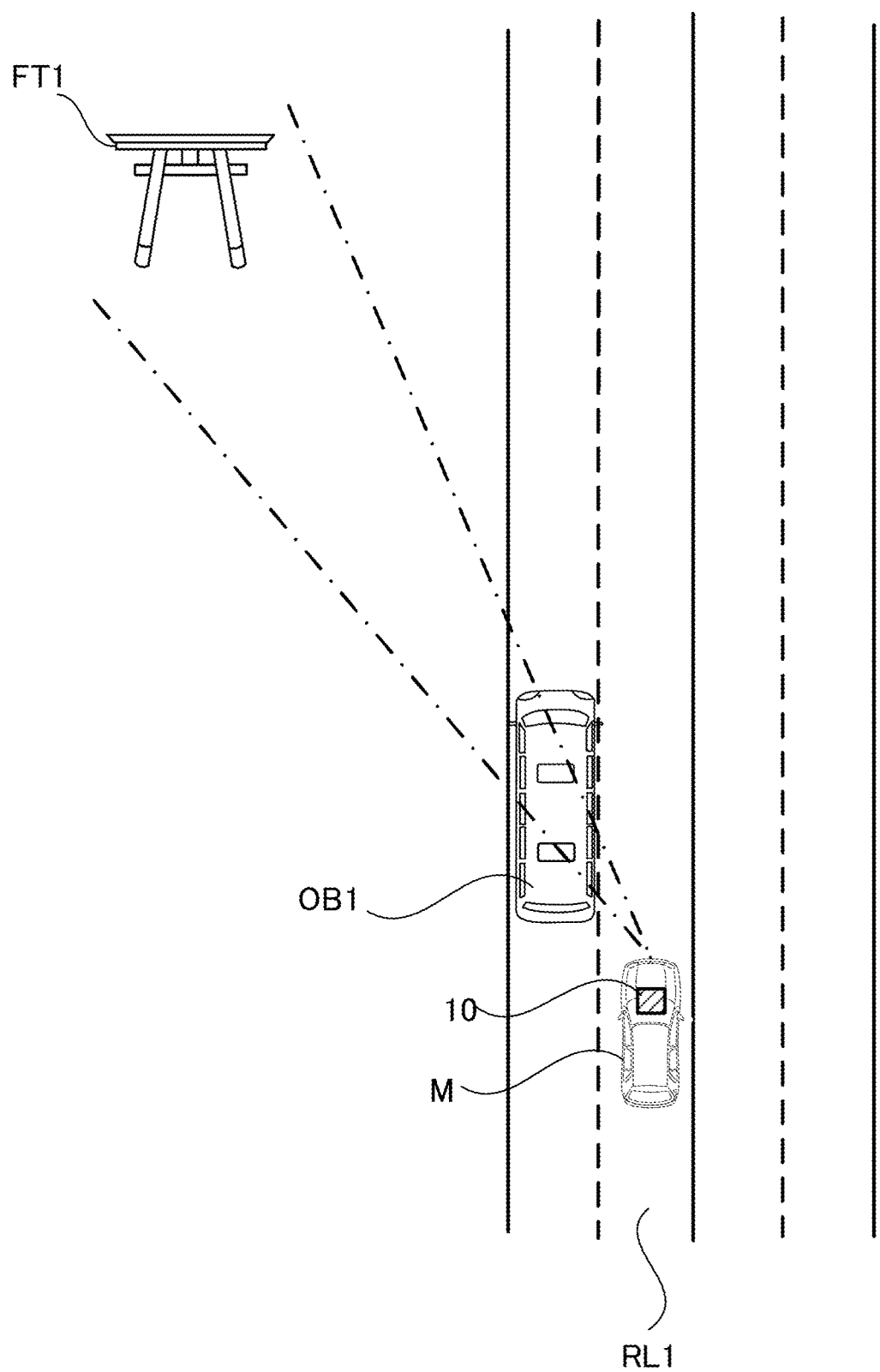
FIG. 9 is a view illustrating another example of the travelling situation of the moving body according to Embodiment 1.

FIG. 9 indicates a case where a bus OB1 is traveling in the left oblique front of the vehicle M, in addition to the travelling situation exemplified in FIG. 7.

In the situation indicated in FIG. 9, the field of view in the left front direction from the vehicle M is obstructed by the bus OB1. In other words, the bus OB1 existing between the vehicle M and the feature FT1 is an obstacle obstructing the visual recognition of the feature FT1 from the vehicle M. In this case, the user boarding the vehicle M cannot visually recognize the feature FT1.

Figure 10:
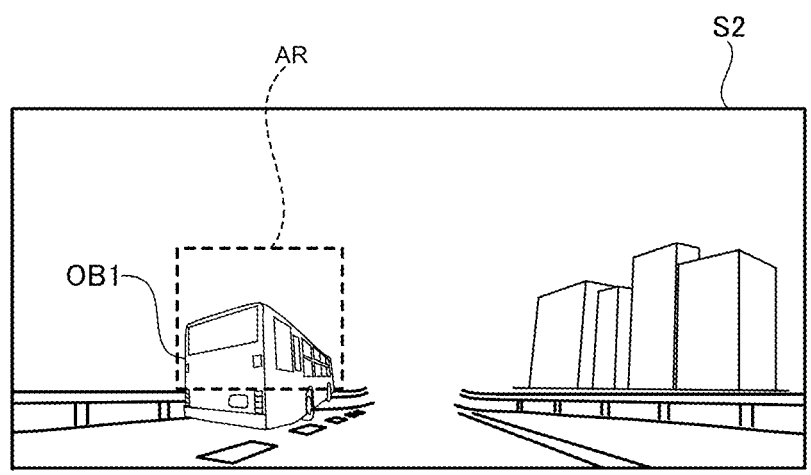
FIG. 10 is a view illustrating another example of the surrounding image used for the guidance according to Embodiment 1.

FIG. 10 is a view illustrating a surrounding image S2 of the vehicle M obtained in the situation exemplified in FIG. 9. When obtaining the surrounding image S2 from the camera 17, the control unit 29 identifies the determination area AR by the above-described method and determines whether or not the feature FT1 is photographed in the identified determination area AR.

As indicated in FIG. 10, the feature FT1 is not photographed in the determination area AR of the surrounding image S2. In other words, an object different from the feature FT1 appears in the determination area AR of the surrounding image S2.

In this case, the control unit 29 identifies the type of the object that is photographed in the determination area AR. For example, with reference to the image DB 27B, the control unit 29 identifies the type of the object that is photographed in the determination area AR. For example, in the image DB 27B, each of the images of many objects is classified into any of a plurality of types and stored.

For example, the control unit 29 identifies the type of the object that is photographed in the determination area AR by comparing the image in the determination area AR of the surrounding image S2 with each of the various images stored in the image DB 27B.

In the example in FIG. 10, since the bus OB1 as an object different from the feature FT1 is photographed in the determination area AR, the type of the object is determined as, for example, a "bus." The type of the object in which the bus OB1 belongs is not limited to a "bus," and may be, for example, a large-sized vehicle.

When an object different from the feature FT1 appears in the determination area AR, the control unit 29 notifies the user of the information regarding the type of the object obstructing the visual recognition of the feature FT1. For example, the control unit 29 displays a message including the type of the object obstructing the visual recognition of the feature FT1 on the display or outputs the message from the speaker 15 by voice. For example, a message such as "There is a large torii in the back of the bus in the left front" is announced or displayed.

The message including the type of the object may be, for example, a message such as "The large torii is not visible due to the bus in the left front," indicating that the feature is not visually recognizable due to the existence of the object.

By being noticed of such information including the type of the object, the user can know the reason why the feature FT1 cannot be visually recognized when traveling in the road section RL1, that is, when the vehicle M is at a position where the feature FT1 is supposed to be visually recognizable.

Furthermore, in addition to the information including the type of the object, the control unit 29 may notify movement instruction information for moving the vehicle M such that the feature FT1 can be visually recognized, that is, such that the feature FT1 appears inside the surrounding image. For example, the control unit 29 may perform notification of prompting a traffic lane change as the movement instruction information. For example, the control unit 29 may perform notification of prompting deceleration for keeping an inter-vehicle distance as the movement instruction information.

Specifically, as the movement instruction information, the message such as "There is the large torii in the back of the bus in the left front. It will be visible by changing the traffic lane, in some cases" and "There is the large torii in the back of the bus in the front. It will be visible by keeping the inter-vehicle distance, in some cases" may be announced or displayed.

For example, a database regarding coping methods corresponding to the situations may be preliminarily stored in the storage unit 27. Based on the database, contents of the movement instruction information may be determined.

Thus, by the movement instruction information being notified together with the information including the type of the object, the user can recognize what should be done to visually recognize the feature FT1 when the feature FT1 cannot be visually recognized.

Figure 11:
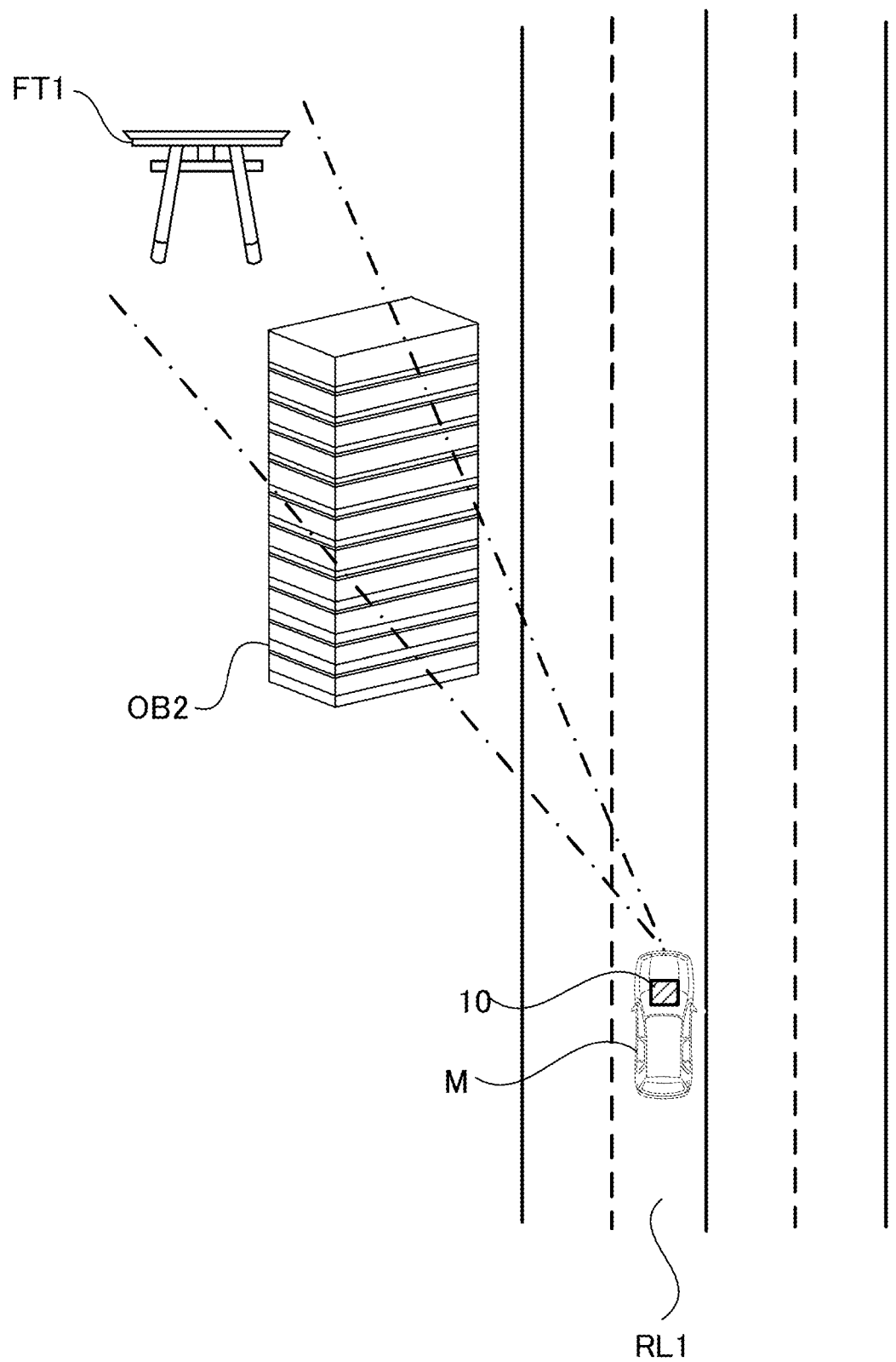
FIG. 11 is a view illustrating another example of the travelling situation of the moving body according to Embodiment 1.

In the travelling situation exemplified in FIG. 7, instead of the bus OB1 traveling in the oblique left front to the vehicle M, FIG. 11 indicates the situation where a tall building OB2 is present along the road in the left front direction of the vehicle M. In the travelling situation in FIG. 11, since the field of view in the left front direction from the vehicle M is obstructed by the tall building OB2, the user inside the vehicle M cannot visually recognize the feature FT1.

In the case in FIG. 11 also, the control unit 29 determines that the feature FT1 is not photographed in the determination area AR of the surrounding image, that is, an object different from the feature FT1 appears. Then, as described above, the type of the object appearing in the determination area AR is identified. The type of the object for the tall building OB2 is identified as, for example, a "tall building," a "building," or the like.

Similarly to the case of FIG. 10, the control unit 29 notifies the user of the information regarding the type of the object obstructing the visual recognition of the feature FT1. For example, a message such as "There is the large torii in the back of the building in the left front" is announced or displayed.

Furthermore, the control unit 29 may determine whether or not the object is a predetermined object. The predetermined object means, for example, a fixed object that does not move or change in a short period of time, for example, real estate including fixtures of a land such as a building and a bridge.

When the object obstructing the visual recognition of the visually recognizable feature is the fixed object such as real estate, it is highly likely that the fixed object is not included in the map information. Accordingly, the control unit 29 transmits the information regarding the type of the object for the fixed object, the position information of the fixed object, and the information indicating the visually recognizable feature whose visual recognition is obstructed by the fixed object to the server S. Furthermore, in addition to these pieces of information, the image of the fixed object photographed by the camera 17 may be transmitted to the server S. The position information of the fixed object may be calculated, for example, from a relative position of the fixed object from the vehicle M obtained by a known position measurement device such as a Light Detection and Ranging (LIDAR) sensor mounted on the vehicle M and the position information of the vehicle M obtained by the GPS receiver 19.

When receiving the information on the fixed object and the information indicating the visually recognizable feature, the server S adds the information of the fixed object into the map information held by the server S. This allows maintaining the map information in a latest state even when, for example, a new building is constructed.

The server S may, for example, remove the visually recognizable feature whose visual recognition is obstructed by the fixed object from the feature that is visually recognizable from the corresponding road section. For example, in the example in FIG. 11, the feature FT1 is removed from the feature that is visually recognizable from the road section RL1.

A predetermined obstacle such as real estate constantly obstructs the visual recognition of the feature FT1 from the road section RL1 also when not only the vehicle M but also other vehicles travel in the road section RL1.

Accordingly, for such an object, by removing it from the visually recognizable feature linked to the road section RL1 in the map information, a situation where the visually recognizable feature cannot be visually recognized can be avoided.

Thus, in the feature guidance device 10, by the information indicating the visually recognizable feature and the information regarding the object obstructing the visual recognition of the visually recognizable feature being transmitted to the server S, for example, the situation where the visually recognizable feature cannot be visually recognized from the road section to which the visually recognizable feature is linked is avoided and the feature guidance from the next time will become smooth.

By adding the position information and the type of the object obstructing the visual recognition of the visually recognizable feature to map data, the map data can be maintained in the latest state.

Figure 12:
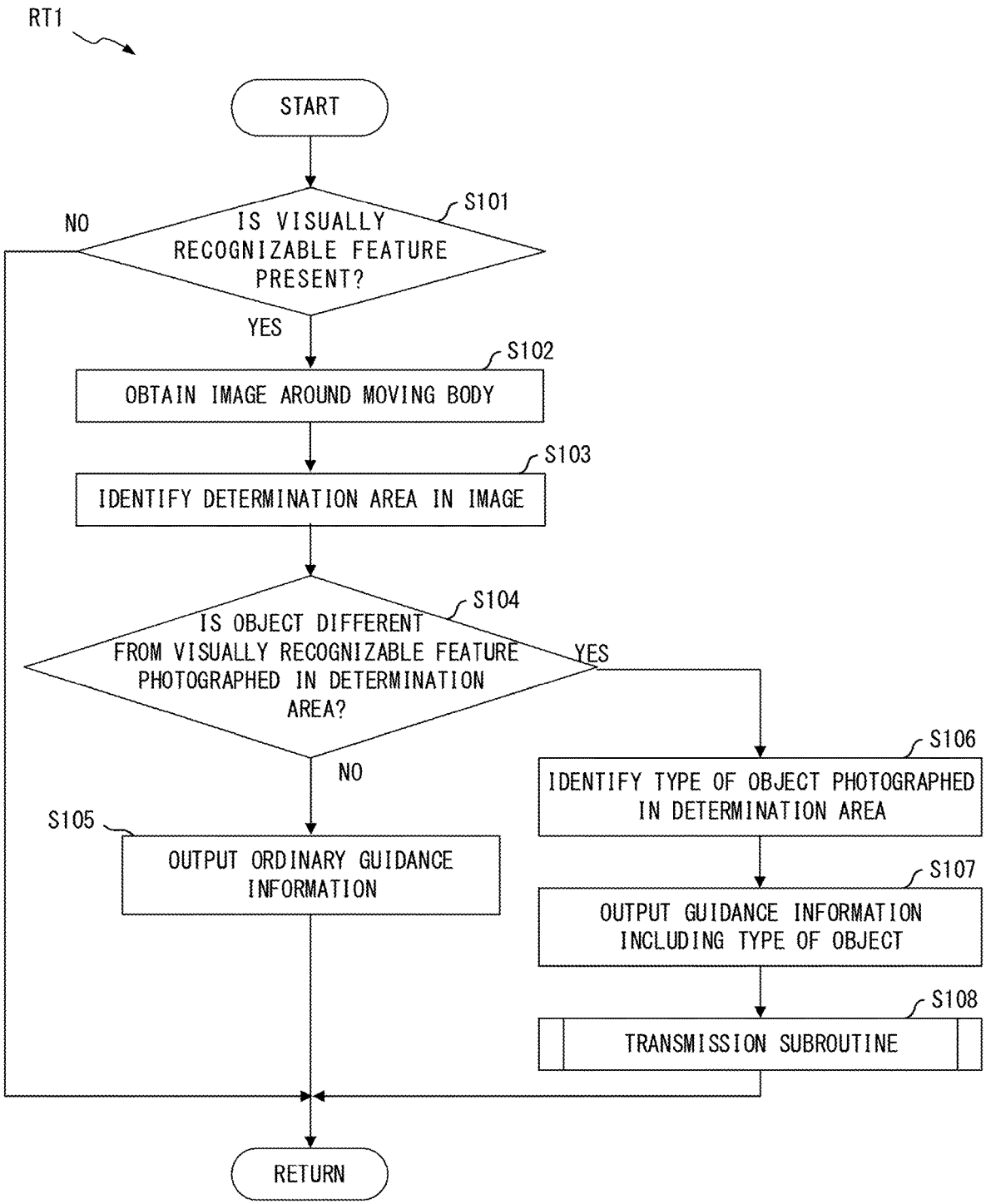
FIG. 12 is a flowchart illustrating one example of a routine executed by the notification apparatus according to Embodiment 1.

FIG. 12 is a flowchart illustrating a feature guidance routine RT1 executed by the control unit 29 of the feature guidance device 10. The control unit 29 starts the feature guidance routine RT1 when, for example, a power source is turned on to the feature guidance device 10.

When starting the feature guidance routine RT1, the control unit 29 determines whether or not the feature that is visually recognizable from the road section where the vehicle M is currently traveling is present on the map data (Step S101). At Step S101, for example, the control unit 29 refers to the map information DB 27A and determines that the visually recognizable feature is present when the visually recognizable feature linked to the road section in which the vehicle M is currently traveling is present.

When the visually recognizable feature is determined to be present (YES at Step S101), the control unit 29 obtains the image around the vehicle M as the moving body from the camera 17 (Step S102). At Step S102, the control unit 29 functions as an image obtaining unit that executes obtaining of the surrounding image (an image obtaining step).

After executing Step S102, the control unit 29 identifies the feature expectation area where the visually recognizable feature is expected to appear inside the surrounding image (Step S103). The feature expectation area is the determination area for determining whether or not the visually recognizable feature is photographed inside the surrounding image. At Step S103, the control unit 29 identifies the determination area based on, for example, the orientation of the visually recognizable feature relative to the photographing direction at a time when the surrounding image S1 was photographed and the distance between the vehicle M and the visually recognizable feature. At Step S103, the control unit 29 functions as an area identifying unit.

At Step S103, for example, when a plurality of visually recognizable features are linked to the road section where the vehicle M is traveling, the control unit 29 selects the feature whose distance is closest to the current position of the vehicle M and identifies the determination area for the selected visually recognizable feature.

After executing Step S103, the control unit 29 determines whether or not an object different from the visually recognizable feature is photographed in the determination area inside the surrounding image (Step S104).

At Step S104, for example, the control unit 29 determines whether or not the object different from the visually recognizable feature appears in the determination area by comparing the image of the visually recognizable feature identified at Step S101 of the images preliminarily stored in the map information DB 27A of the storage unit 27 with the determination area of the surrounding image S1. At Step S104, the control unit 29 functions as a determining unit determining whether or not the object different from the visually recognizable feature appears in the feature expectation area inside the surrounding image.

At Step S104, when the feature different from the visually recognizable feature is determined to be not photographed (NO at Step S104), that is, the visually recognizable feature is determined to be photographed, the control unit 29 output ordinary guidance information regarding the visually recognizable feature (Step S105).

For example, at Step S105, the control unit 29 notifies the user of a fact that the visually recognizable feature can be visually recognized and the guidance information indicating the orientation where the visually recognizable feature is visually recognized, by a voice output from the speaker 15 or image display on the display. At Step S105, for example, an announcement such as "You can see the large torii on your left" is made.

At Step S104, when the feature different from the visually recognizable feature is determined to be photographed (YES at Step S104), that is, the visually recognizable feature is determined to be not photographed, the control unit 29 identifies the type of the object being photographed in the determination area (Step S106).

At Step S106, for example, the type of the object different from the visually recognizable feature is identified by image analysis being performed for the determination area of the surrounding image.

At Step S106, for example, the control unit 29 identifies the type of the object appearing inside the surrounding image by comparison between the determination area of the surrounding image and the images of various objects stored in the image DB 27B of the storage unit 27 using, for example, pattern matching.

At Step S106, the control unit 29 functions as an object type identifying unit identifying the type of the object appearing in the determination area by performing the image analysis of the surrounding image.

After executing Step S106, the control unit 29 outputs the guidance information including the type of the object (Step S107). At Step S107, for example, the control unit 29 notifies the user of the information indicating the type of the object appearing in the determination area by the voice output from the speaker 15 or the image display on the display.

For example, at Step S107, the guidance information indicating that the visually recognizable feature is present behind the object identified at Step S106 is presented by the voice or image display.

At Step S107, when the feature different from the predetermined feature appears in the determination area, the control unit 29 functions as a notifying unit executing notification (a notification step) of the information regarding the type of the object. The control unit 29 notifies the information regarding the type of the object when the vehicle M is at a position where the predetermined feature is supposed to be visually recognizable.

By notification of the information regarding the type of the object different from the visually recognizable feature, the user can know the reason why the visually recognizable feature cannot be visually recognized. Since the guidance information can be presented in real time when the vehicle M is at a position where the visually recognizable feature is supposed to be visually recognizable, doubts and anxieties of the user due to the fact that the visually recognizable feature cannot be visually recognized can be resolved on the spot.

After executing Step S107, the control unit 29 executes a transmission subroutine (Step S108) and transmits the information including the type of the object outside. At Step S108, for example, in addition to the type of the object being photographed in the determination area, the information or the like indicating the visually recognizable feature that cannot be visually recognized due to the object, that is, the feature that has become the target of determination at Step S104 or the like is transmitted to the external server S.

After executing Step S105, when the visually recognizable feature is determined to be not present after executing Step S108 or at Step S101 (NO at Step S101), the control unit 29 ends the feature guidance routine RT1 and repeatedly executes the feature guidance routine RT1.

Figure 13:
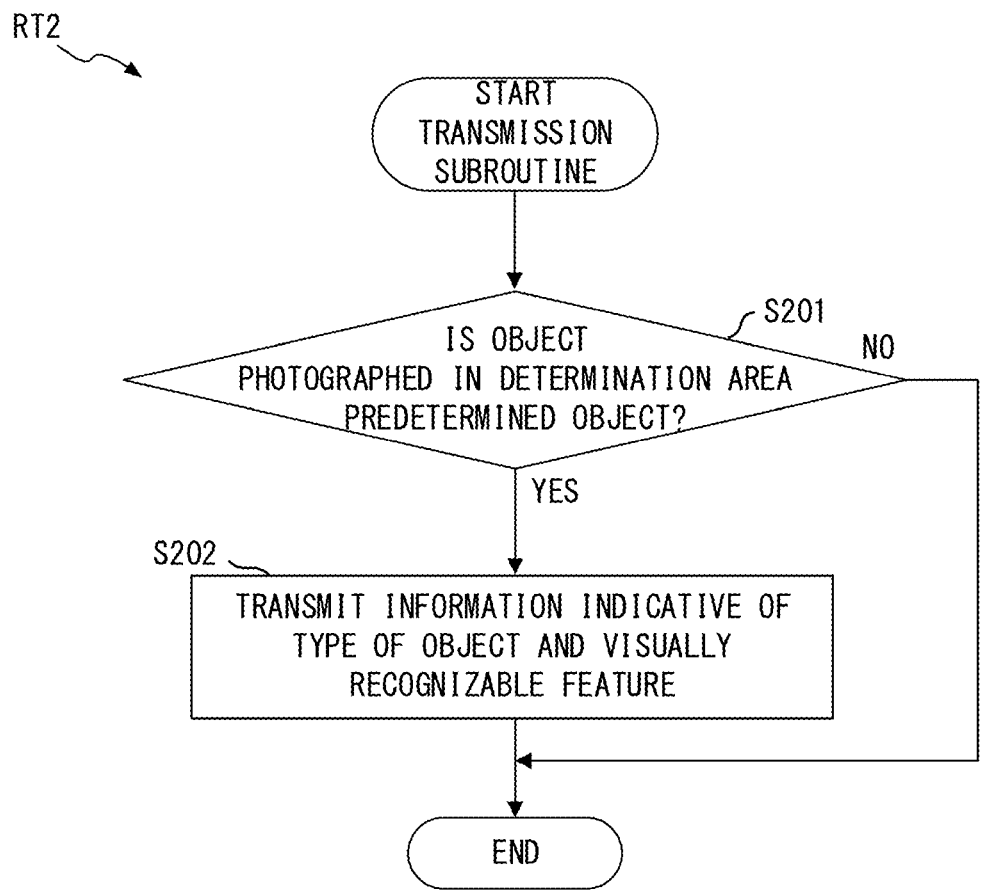
FIG. 13 is a flowchart illustrating one example of a subroutine executed by the notification apparatus according to Embodiment 1.

FIG. 13 is a flowchart indicating a transmission subroutine RT2 that is one example of a subroutine executed at Step S108 of the feature guidance routine RT1.

When starting the transmission subroutine RT2, the control unit 29 determines whether or not the type of the object being photographed in the determination area identified at Step S106 corresponds to the predetermined object (Step S201). The predetermined object is, for example, a fixed object such as real estate, and an object that constantly obstructs the visual recognition of the feature linked to the road section as the visually recognizable feature.

For example, at Step S201, a table for determining whether or not it is the predetermined object is stored in the storage unit 27, and based on the table, it is determined whether or not the type of the object being photographed in the determination area corresponds to the predetermined object.

At Step S201, when it is determined to be the predetermined object (YES at Step S201), the control unit 29 transmits the type of the object being photographed in the determination area and the information indicating the visually recognizable feature that has become the target of determination at Step S104 outside (Step S202).

At Step S202, for example, the information indicating the type of the object and the visually recognizable feature is transmitted to the server S, and the map information held in the server S is updated.

After executing Step S202 or when it is determined to be not the predetermined object at Step S201 (NO at Step S201), the control unit 29 ends the transmission subroutine RT2.

The feature guidance by the feature guidance device 10 of this embodiment may be executed as a part of the flow of the route guidance by the navigation device.

As described above in detail, according to the feature guidance device 10 as the notification apparatus of Embodiment 1, when the surrounding image of the moving body, which is photographed from the current position of the moving body by the camera disposed in the moving body is obtained, the feature expectation area where the predetermined feature is expected to be photographed inside the surrounding image is identified, and the object different from the predetermined feature is photographed in the feature expectation area, the information including the type of the object can be notified to the user, the external server, or the like. The predetermined feature is a feature that can be determined from the map information to be visually recognizable from the current position of the moving body and a feature that is linked to the road section where the vehicle M of this embodiment is currently traveling in the map information.

Accordingly, according to the notification apparatus of Embodiment 1, when the visual recognition of the predetermined feature is obstructed due to the object different from the predetermined feature, it is possible to notify the user or the server of what the type of the object that causes the obstruction of the visual recognition is.

Accordingly, in a case where the guidance using the feature visually recognizable from the road is provided, when the feature cannot be visually recognized from the road, it is possible to provide the notification apparatus that can reduce bewilderment of the user.

When the type of the object different from the predetermined feature is notified to the user by the notification apparatus of this embodiment, when the user is uneasy or dissatisfied due to the fact that the visually recognizable feature cannot be visually recognized, it can be resolved, and the psychological stress of the user is likely to be reduced.

When the type of the object different from the predetermined feature is notified to the server by the notification apparatus of this embodiment, it is likely to maintain the map information in the latest state by this. In addition, a state where the visually recognizable feature cannot be constantly visually recognized by construction of a new building or the like can be avoided, and it becomes possible to perform the route guidance with high accuracy by using the updated map information.

Embodiment 2

With reference to FIG. 14 to FIG. 20, functions of a route guidance device 50 as a notification apparatus according to Embodiment 2 will be described. The route guidance device 50 is configured similarly to the feature guidance device 10 described using FIGS. 1 to 3, and the contents of the information stored in the storage unit 27 and the process contents executed by the control unit 29 are partially different. In the following, descriptions of the portions common to the case of Embodiment 1 will be omitted.

The control unit 29 executes a route guidance program as a notification program of this embodiment to perform the route guidance. When executing the route guidance program, for example, the control unit 29 accepts the input of route search conditions such as a destination via the microphone 11 or the touch panel display 13 to generate the route based on the map information. Subsequently, the control unit 29 performs the route guidance in accordance with the generated route.

In the storage unit 27, the route guidance program is stored. In the map information DB 27A in the storage unit 27, data linked to a landmark feature as a landmark is stored for each guidance point in the route guidance. In the map information DB 27A, the position information of the landmark feature is stored.

Figure 14:
FIG. 14 is a diagram illustrating one example of data included in map information used for route guidance of Embodiment 2.

FIG. 14 is a diagram illustrating one example of data of the landmark features linked to the guidance points stored in the map information DB 27A as a table TB3. In the table TB3, the landmark feature to be a landmark at each guidance point is linked to each of guidance points GP1, GP2 described in a field of a guidance point ID.

In the specification, the guidance point is a point where driving operations such as a left turn or a right turn are required or a point where an alert is required in a travel route of the vehicle M. For example, in the route guidance of this embodiment, it is a point where guidance such as prompting a left turn or a right turn by voice is performed when the vehicle M reaches inside a predetermined distance.

In the specification, a feature that serves as a landmark (a landmark) at a guidance point is referred to as a landmark feature. For example, the landmark feature includes a building that serves as the landmark in confirming that it is an intersection where a left turn or a right turn should be made or the like. For example, a feature present inside a predetermined distance from a guidance point, a feature opposed to a guidance point, a feature having a height equal to or more than a predetermined height, and the like can be the landmark feature at the guidance point.

In the table TB3, the guidance points are linked to the features that can be visually recognized from the road section adjacent to the guidance points and serve as a landmark. A different feature may be linked as a landmark feature for each road section connected to the guidance point.

FIG. 15 is a diagram illustrating one example of the position information of the landmark features as part of the map information stored in the map information DB 27A of the storage unit 27 as table TB4. As indicated in FIG. 15, a landmark feature ID indicative of each of the landmark features are linked to the position information of the landmark features identified by the landmark feature ID.

Figure 16:
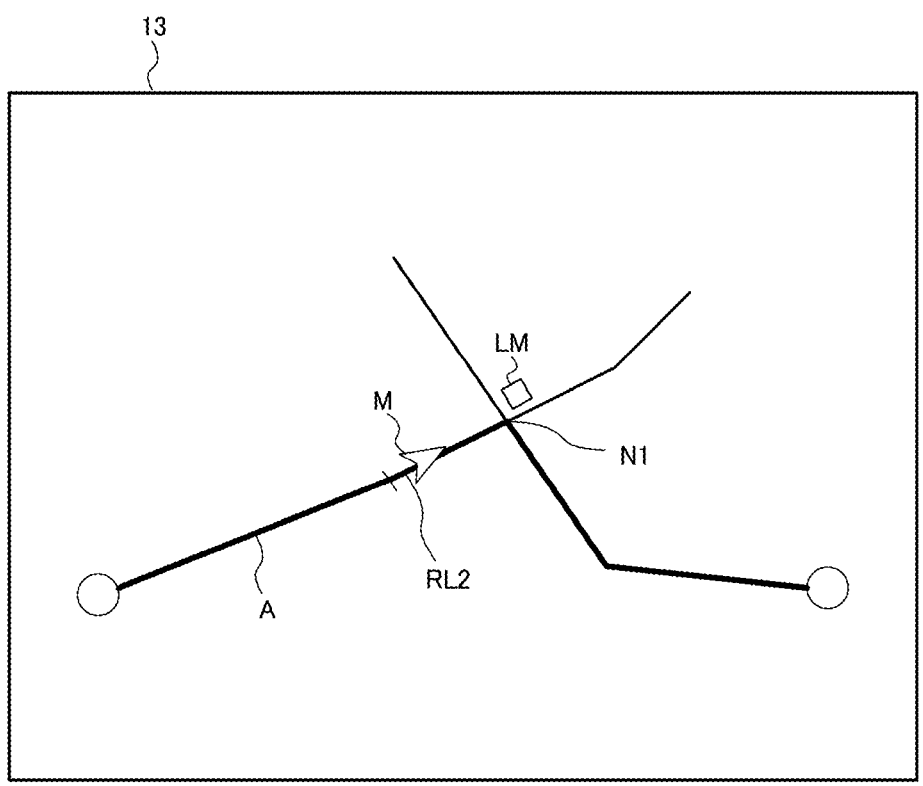
FIG. 16 is a view illustrating one example of route guidance view according to Embodiment 2.

FIG. 16 is a view illustrating one example of the route guidance view displayed on the display in this embodiment. In FIG. 16, by being superimposed on an image of a route A of the vehicle M including the road section RL2, the current position of the vehicle M, an intersection N1 as the guidance point on the route A, and a landmark feature LM linked to the intersection N1 are displayed.

As indicated in FIG. 16, the vehicle M is traveling in the road section RL2 where the vehicle M can visually recognize the landmark feature LM. For example, based on the current position and the travelling direction of the vehicle M and the position information of the landmark feature LM included in the map data, the orientation where the landmark feature LM relative to the travelling direction of the vehicle M can be visually recognized, and a distance between the vehicle M and the landmark feature LM can be calculated.

Figure 17:
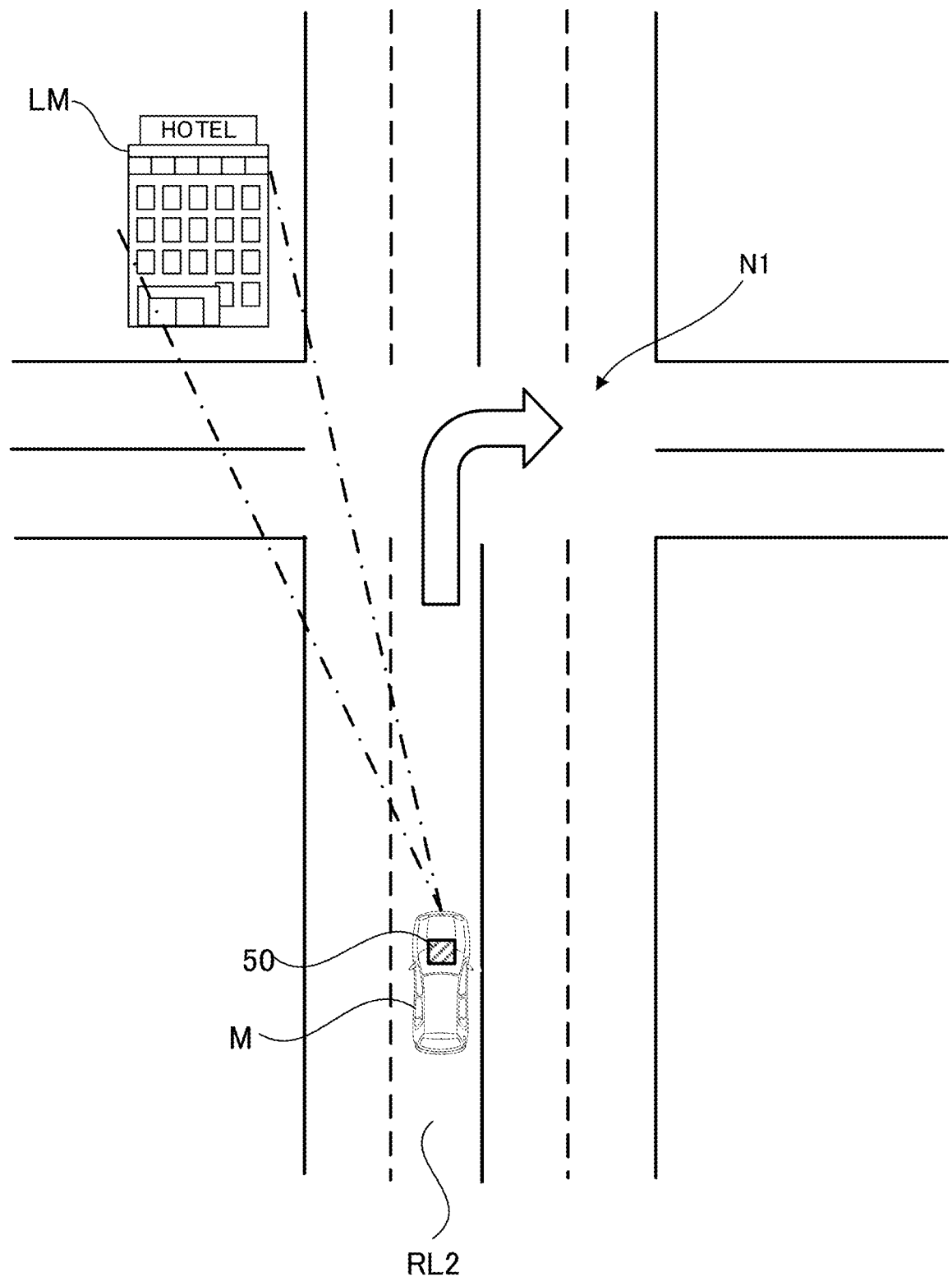
FIG. 17 is a view illustrating one example of a travelling situation in route guidance according to Embodiment 2.

FIG. 17 is a view illustrating one example of the travelling situation of the vehicle M in the route guidance indicated in FIG. 16. In the situation in FIG. 17, the vehicle M is traveling in the road section RL2 within the route A in accordance with the guidance by the route guidance device 50 and is approaching the intersection N1. The route A is a route turning right at the intersection N1.

From the current position of the vehicle M, the landmark feature LM that is a feature serving as a landmark in confirming the intersection at which a right turn should be made can be visually recognized. When the current position of the vehicle M is approaching inside the predetermined distance of the landmark feature LM, the control unit 29 of the route guidance device 50 obtains the surrounding image of the vehicle M from the camera 17 and identifies the determination area where the landmark feature LM is expected to be photographed inside the surrounding image.

When the landmark feature LM is determined to be photographed in the determination area, the route guidance device 50 uses the landmark feature LM as a landmark to perform an announcement of the guidance prompting a right turn at the intersection N1. In the situation in FIG. 17, for example, a voice of "At 50 m forward, turn right at the intersection where ∘∘ hotel is located" is output from the speaker 15. The driver of the vehicle M can use the landmark feature LM as a landmark and can recognize that the intersection with the landmark feature LM is an intersection at which a right turn should be made.

Figure 18:
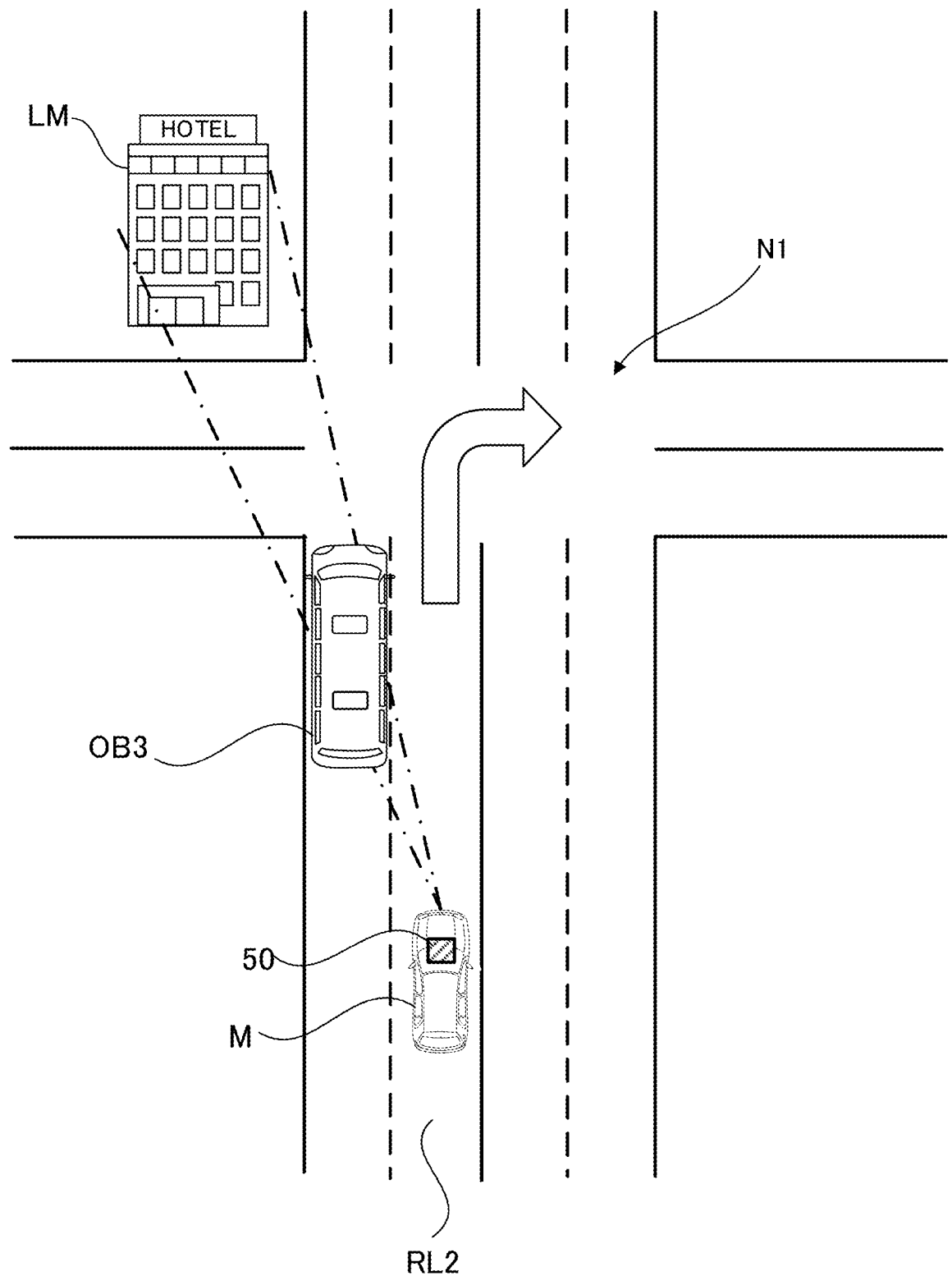
FIG. 18 is a view illustrating another example of the travelling situation in the route guidance according to Embodiment 2.

FIG. 18 is a view illustrating another example of the travelling situation of the vehicle M in the route guidance indicated in FIG. 16. In FIG. 18, in addition to the situation in FIG. 17, a bus OB3 is traveling in the left front of the vehicle M. The landmark feature LM cannot be visually recognized from the current position of the vehicle M since the bus OB3 is the obstacle.

In the situation in FIG. 18, when the control unit 29 of the route guidance device 50 identifies the determination area by the above-described method, the bus OB3 that is the object different from the landmark feature LM appears in the determination area.

The route guidance device 50 determines that the landmark feature LM is not photographed in the determination area, that is, an object different from the landmark feature LM is photographed. Then, the route guidance device 50 outputs the guidance information including the information regarding the different object, that is, an obstacle obstructing the visual recognition of the landmark feature LM.

For example, in the situation in FIG. 18, the voice of "At 50 m forward, turn right at the intersection where ∘∘ hotel is located. The ∘∘ hotel is located behind the bus in the left front." or the like is output from the speaker 15. By this, the driver of the vehicle M can set a guideline for the position of the landmark feature LM even when the landmark feature LM cannot be visually recognized.

Figure 19:
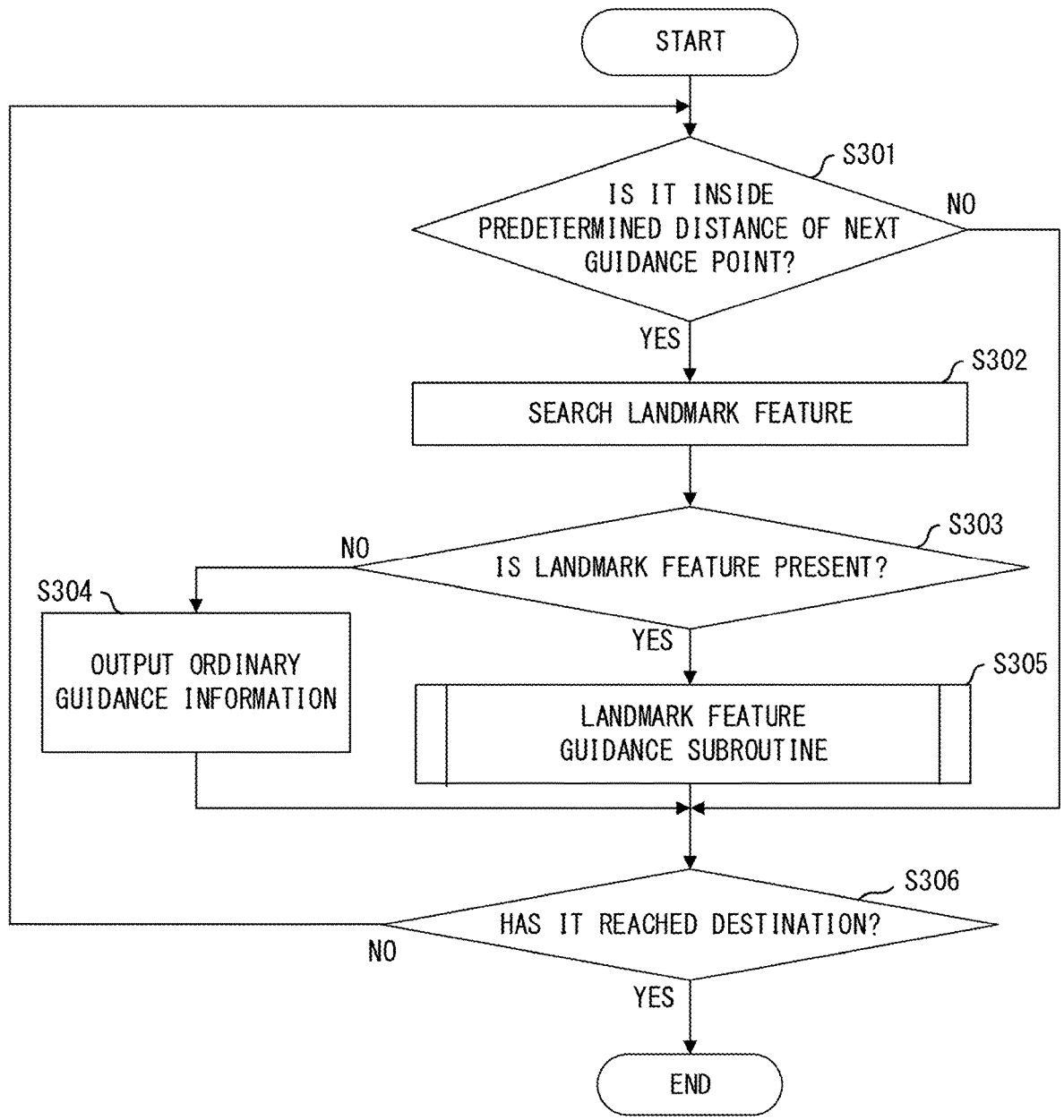
FIG. 19 is a flowchart illustrating one example of a routine executed by a notification apparatus according to Embodiment 2.

FIG. 19 is a flowchart indicating a route guidance routine RT3 that is one example of processes executed by the control unit 29 of the route guidance device 50. For example, when the route of the vehicle M is determined, the control unit 29 starts the route guidance routine RT3.

When starting the route guidance routine RT3, the control unit 29 determines whether or not the current position of the vehicle M has reached inside the predetermined distance of the next guidance point (Step S301). At Step S301, for example, the control unit 29 determines whether or not it is inside the predetermined distance by reading the map information from the map information DB 27A, searching a guidance point closest from the current position of the vehicle M based on the position information of each of the guidance points on the route, and calculating a distance between the guidance point and the current position of the vehicle M.

At Step S301, when it has been determined to reach inside the predetermined distance of the next guidance point (YES at Step S301), the control unit 29 refers to the map information (for example, FIG. 14) and searches the landmark feature linked to the next guidance point (Step S302).

After executing Step S302, the control unit 29 determines whether or not the landmark feature that serves as the landmark is present at the next guidance point (Step S303).

At Step S303, when the landmark feature is determined to be not present (NO at Step S303), the control unit 29 supplies ordinary guidance information that does not use the landmark feature to the speaker 15 or the display via the output unit 25 (Step S304). At Step S304, for example, an announcement of guidance prompting a right turn at the intersection N1 is performed with a sign of an intersection name, a traffic light, or the like as a landmark.

At Step S303, the landmark feature is determined to be present (YES at Step S303), the control unit 29 executes a landmark feature guidance subroutine (Step S305) to output the guidance information in accordance with the situation.

At Step S301, when it has been determined not to reach inside the predetermined distance of the next guidance point (NO at Step S301), after executing Step S304 or after executing Step S305, the control unit 29 determines whether or not it has reached the destination (Step S306).

At Step S306, when it has been determined not to reach the destination (NO at Step S306), the control unit 29 returns to Step S301 and determines again whether or not the current position of the vehicle M is inside the predetermined distance of the next guidance point. At Step S306, when it has been determined to reach the destination (YES at Step S306), the control unit 29 ends the route guidance routine RT3.

Figure 20:
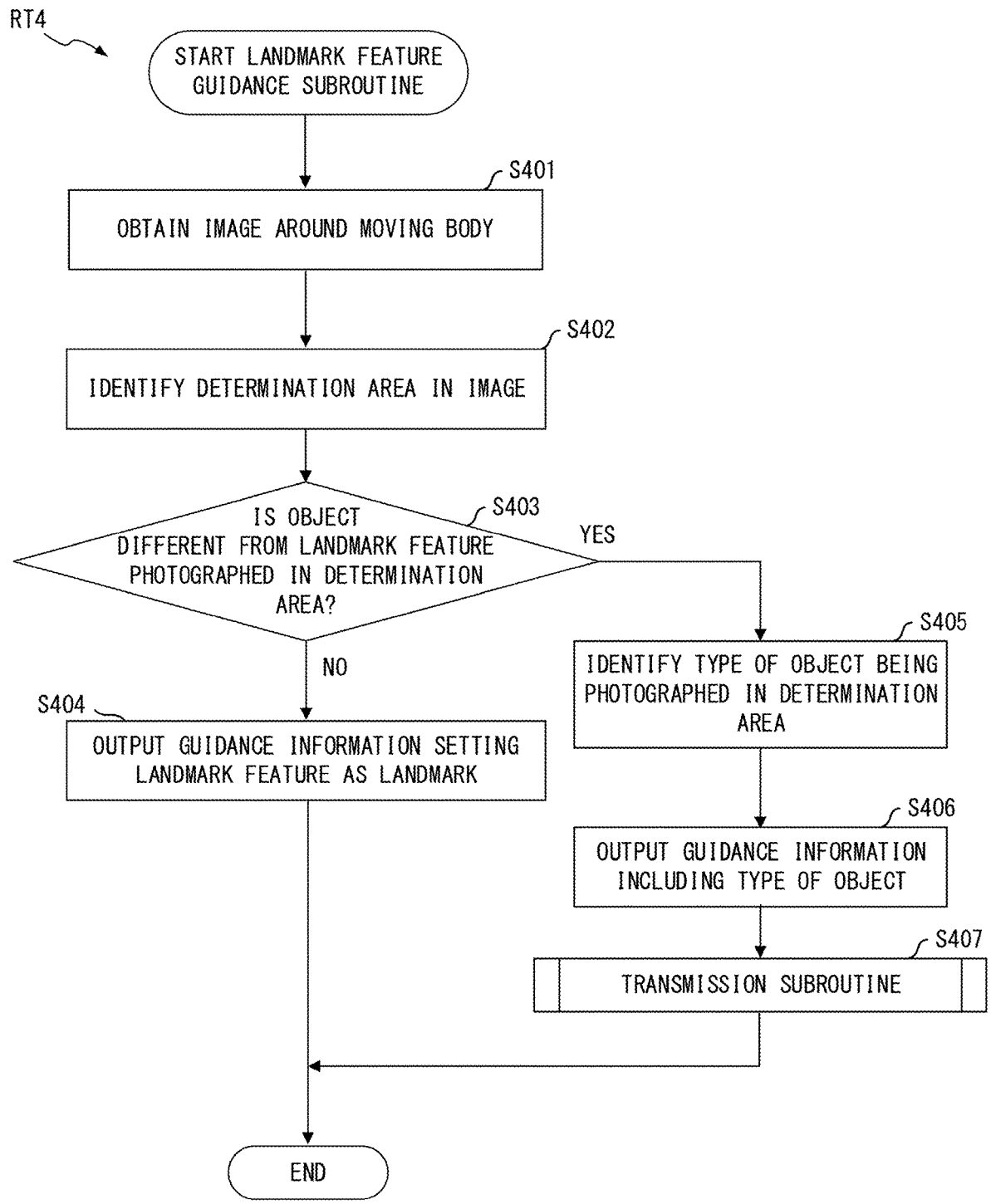
FIG. 20 is a flowchart illustrating one example of a subroutine executed by the notification apparatus according to Embodiment 2.

FIG. 20 is a flowchart indicating the landmark feature guidance subroutine RT4 that is one example of a subroutine executed at Step S305 of the route guidance routine RT3. The landmark feature guidance subroutine RT4 has contents similar to Step S102 to Step S108 of the feature guidance routine RT1 described in FIG. 12, and since the only difference is that the landmark feature is handled instead of the visually recognizable feature, descriptions will be given with detailed contents omitted.

When starting the landmark feature guidance subroutine RT4, the control unit 29 obtains the surrounding image of the vehicle M from the camera 17 (Step S401) and identifies the determination area as an area where the landmark feature inside the surrounding image is expected to be photographed (Step S402). As described above, at Step S402, for example, the determination area is identified based on the orientation of the landmark feature relative to the photographing direction at the time when the surrounding image was photographed and the distance between the vehicle M and the landmark feature.

When an object different from the landmark feature is determined to be not photographed in the determination area (NO at Step S403), the control unit 29 outputs the guidance information setting the landmark feature as the landmark (Step S404). For example, in a case of the guidance prompting a right turn at an intersection using a hotel to be the landmark feature as a landmark, an announcement of "At 50 m forward, turn right at the intersection where OO hotel is located" or the like is performed.

When an object different from the landmark feature is determined to be photographed in the determination area (YES at Step S403), the control unit 29 identifies the type of the object being photographed in the determination area (Step S405) and outputs the guidance information including the type of the object (Step S406). For example, when the landmark feature is "OO hotel," and the type of the object is a bus, an announcement of "OO hotel is located behind the bus in the left front" or the like is performed.

Subsequently, the control unit 29 executes the transmission subroutine (Step S407) and transmits the information regarding the type of the object to the server S. For example, the transmission subroutine at Step S407 may have similar contents to that of the transmission subroutine RT2 described in FIG. 13. Unlike the transmission subroutine RT2, the transmission subroutine at Step S407 is not limited to a case where an obstacle obstructing the visual recognition of the landmark feature is a fixed object and may transmit data regarding an obstacle to the server even when the obstacle is a moving body such as another vehicle. By this, data regarding a frequency where the landmark feature cannot be visually recognized due to a traffic situation and the like, for example, the visual recognition being obstructed by a large-sized truck, is accumulated in the server S. For example, the data accumulated in such manner serves as a determination material in excluding a landmark feature whose visual recognition is frequently obstructed due to a traffic situation from the landmark feature at the guidance point.

In the landmark feature guidance subroutine RT4, the transmission subroutine (Step S407) may be omitted.

The route guidance of Embodiment 2 may be executed with the feature guidance of Embodiment 1 combined. For example, in the route guidance, at a point other than the guidance point, the guidance regarding the feature linked to the road section where the vehicle M is traveling may be performed, and when an object obstructing the visual recognition of the feature appears in the determination area inside the surrounding image, the information regarding the type of the object may be notified to the user.

As described above, according to the route guidance device 50 as the notification apparatus of Embodiment 2, while performing the guidance at the guidance point with the feature as the landmark, when an object such as another vehicle becomes the obstacle obstructing the visual recognition, and thus, the landmark feature cannot be visually recognized, the type of the object that becomes the obstacle can be identified, and the information including the type of the object can be notified. Therefore, even when the landmark feature cannot be visually recognized, the user can know the reason why the visual recognition is not possible.

In a case where the route guidance using a feature visually recognizable from a road as a landmark is performed, when the feature cannot be visually recognized from the road, the notification apparatus that can reduce bewilderment of the user can be provided.

According to the route guidance device 50, it is also possible to notify the position where the landmark feature is present together with the type of the object that becomes the obstacle. This allows the user to obtain a guide for the position of the landmark feature.

In the above-described Embodiment 1 and Embodiment 2, the case where the moving body is the vehicle is described, but it is not limited to this. The moving body may be a human. The notification apparatus of the present invention may perform notification regarding the route guidance for movement on foot. The notification apparatus of the present invention is not limited to a case where it is mounted onto a vehicle or other movable devices and may be mounted onto portable devices such as a smart phone and a tablet carried by a user, wearable devices, or the like. It is only necessary that it is configured to be able to obtain the surrounding image photographed from the current position of the moving body.

In the above-described Embodiment 1 and Embodiment 2, while the examples where the processes as the area identifying unit, the determining unit, and the object type identifying unit have been performed by the control unit 29 are described, these processes may be performed on the server S. The notification apparatus of the present invention may be an apparatus that transmits the image data to the server S and receives the information indicative of the type of the object to perform notification.

In the above-described Embodiment 1 and Embodiment 2, while the examples of transmitting and receiving data to and from the server S have been described, it is not limited to this, and the notification apparatus of the present invention does not need to perform communication with the external server.

The road section in the above-described Embodiment 1 and Embodiment 2 may be each of the traffic lanes of the road section.

The map information inside the map information DB 27A in the above-described Embodiment 1 and Embodiment 2 may be, for example, periodically updated, may be, for example, updated by obtaining updated data via the network NW when the map information inside the server S is updated.

The configurations in the above-described Embodiment 1 and Embodiment 2 are merely examples and can be appropriately selected or modified according to an application and the like.

DESCRIPTION OF REFERENCE SIGNS

10 Feature guidance device
11 Microphone
13 Touch panel display
17 Camera
19 GPS receiver
22 Sensor
23 Input unit
24 System bus
25 Output unit
27 Storage unit
29 Control unit
31 Transmission/reception unit

The invention claimed is:

1. A route guidance apparatus using landmarks, the route guidance apparatus comprising:
a processor that functions as:
an image obtaining unit that obtains a surrounding image as an image of a surrounding of a moving body photographed from the moving body;
an area obtaining unit that obtains information including a designation of a first area in the surrounding image, the first area being identified as a known location of a landmark based on map information including position information of the landmark on a map and a position of the moving body at a time when the surrounding image is photographed; and
a route guidance unit that notifies an occupant of the moving body of a route guidance using a landmark,
wherein, when a vehicle as an object different from the landmark used in the route guidance appears in the first area, the route guidance unit notifies the occupant of object information including a type of the vehicle and a direction in which the vehicle exists in addition to the route guidance.

2. The route guidance apparatus according to claim 1, wherein
the route guidance unit notifies the occupant of the moving body of movement instruction information for moving the moving body such that the landmark appears inside the surrounding image together with the object information.

3. The route guidance apparatus according to claim 2, wherein
the route guidance unit notifies the occupant of the moving body of information of prompting a traffic lane change as the movement instruction information.

4. The route guidance apparatus according to claim 1, wherein
the object is a fixed object, and
the route guidance unit notifies the occupant of the moving body of the object information and information indicating the landmark to an external device.

5. The route guidance apparatus according to claim 1, wherein
the surrounding image is an image photographed by a camera where a predetermined direction from the moving body is set as a photographing direction, wherein
the route guidance apparatus comprises an area identifying unit that identifies the first area based on an orientation of the landmark relative to the photographing direction at the time when the surrounding image is photographed and a distance between the moving body and the landmark, and
the route guidance unit notifies the occupant of the moving body of the object information when an object different from the landmark appears in the first area identified by the area identifying unit.

6. The route guidance apparatus according to claim 1, wherein
the map information includes the image of the landmark, wherein
the route guidance apparatus comprises a determining unit that determines whether or not an object different from the landmark appears in an area inside the surrounding image by comparing the image of the landmark with an image in the first area inside the surrounding image, and
the route guidance unit notifies the occupant of the moving body of the object information when an object different from the landmark is determined to appear by the determining unit.

7. The route guidance apparatus according to claim 1, comprising
an object type identifying unit that identifies the type of the object by performing an image analysis of the surrounding image, wherein
the route guidance unit notifies the occupant of the moving body of the object information including information on the type of the object identified by the object type identifying unit.

8. A route guidance method performed by a processor of a route guidance apparatus using landmarks, the route guidance method comprising:
an image obtaining step of obtaining a surrounding image as an image of a surrounding of a moving body photographed from the moving body;
an area obtaining step of obtaining information including a designation of a first area in the surrounding image, the first area being identified as a known location of a landmark based on map information including position information of the landmark on a map and a position of the moving body at a time when the surrounding image is photographed; and
a route guidance step of notifying an occupant of the moving body of a route guidance using a landmark,
wherein when a vehicle as an object different from the landmark used in the route guidance appears in the first area, the route guidance step includes notifying the occupant of object information including a type of the vehicle and a direction in which the vehicle exists in addition to the route guidance.

9. A non-transitory computer readable medium, storing instructions for a route guidance program executed by a route guidance apparatus comprising a computer, the instructions for the route guidance program causing the computer to execute:
an image obtaining step of obtaining a surrounding image as an image of a surrounding of a moving body photographed from the moving body;
an area obtaining step of obtaining information including a designation of a first area in the surrounding image, the first area being identified as a known location of a landmark based on map information including position information of the landmark on a map and a position of the moving body at a time when the surrounding image is photographed; and
a route guidance step of notifying an occupant of the moving body of a route guidance using a landmark,
wherein when a vehicle as an object different from the landmark used in the route guidance appears in the first area, the route guidance step includes notifying the occupant of object information including a type of the vehicle and a direction in which the vehicle exists in addition to the route guidance.

* * * * *